(12) United States Patent
Stiehler et al.

(10) Patent No.: US 11,377,966 B2
(45) Date of Patent: Jul. 5, 2022

(54) GAS TURBINE MOVING BLADE

(71) Applicant: MTU Aero Engines AG, Munich (DE)

(72) Inventors: Frank Stiehler, Bad Liebenwerda (DE); Lars Schellhorn, Saalfeld (DE)

(73) Assignee: MTU Aero Engines AG, Munich (DE)

( * ) Notice: Subject to any disclaimer, the term of this patent is extended or adjusted under 35 U.S.C. 154(b) by 176 days.

(21) Appl. No.: 16/571,380

(22) Filed: Sep. 16, 2019

(65) Prior Publication Data

US 2020/0088044 A1  Mar. 19, 2020

(30) Foreign Application Priority Data

Sep. 17, 2018  (DE) .......................... 102018215728.6

(51) Int. Cl.
| | |
|---|---|
| *F01D 5/20* | (2006.01) |
| *D01D 5/14* | (2006.01) |
| *F01D 5/22* | (2006.01) |
| *B33Y 10/00* | (2015.01) |
| *B33Y 80/00* | (2015.01) |
| *F01D 5/14* | (2006.01) |

(52) U.S. Cl.
CPC .............. *F01D 5/20* (2013.01); *F01D 5/141* (2013.01); *B33Y 10/00* (2014.12); *B33Y 80/00* (2014.12); *F05D 2230/30* (2013.01); *F05D 2240/307* (2013.01)

(58) Field of Classification Search
CPC . F01D 5/225; F01D 5/20; F01D 5/141; F01D 5/143; F01D 11/08; F01D 25/24; F05D 2240/80; F05D 2230/30; F05D 2240/307; F05B 2240/11; F05B 2240/33; B33Y 10/00; B33Y 80/00
See application file for complete search history.

(56) References Cited

U.S. PATENT DOCUMENTS 6,857,853 B1 *   2/2005  Tomberg ................. F01D 5/225
                                                  416/192
7,134,838 B2 *  11/2006  Dube ...................... F01D 5/225
                                                  415/173.5

(Continued)

FOREIGN PATENT DOCUMENTS

DE       102009030566 A1    12/2010
EP           1507064 A2      2/2005

(Continued)

*Primary Examiner* — Eric J Zamora Alvarez
(74) *Attorney, Agent, or Firm* — Davidson, Davidson & Kappel, LLC

(57) ABSTRACT

A moving blade for a turbine or compressor stage of a gas turbine is provided, including a vane (10) and a radially outer shroud (20), for at least one contour point ($P_K$) of an outer contour of a profile cross section (P) of the vane at a radial outer gas channel boundary, the wall thickness of the shroud at at least one edge point ($P_R$) of the shroud, whose connecting line (V), including the contour point with a normal (N), which is perpendicular to the outer contour of the profile cross section in the contour point, encloses an angle (σ), which is no more than 5°, is less than a wall thickness of the shroud at the contour point, the wall thickness of the shroud decreasing strictly monotonously along the connecting line.

16 Claims, 3 Drawing Sheets

(56) References Cited

U.S. PATENT DOCUMENTS

| | | | |
|---|---|---|---|
| 9,322,281 B2 | 4/2016 | Schlemmer et al. | |
| 2015/0023793 A1 | 1/2015 | Bensalah et al. | |
| 2015/0118031 A1 | 4/2015 | Bindingnavale et al. | |
| 2017/0183971 A1 | 6/2017 | McDufford et al. | |
| 2018/0030838 A1* | 2/2018 | Tham | F01D 5/225 |
| 2018/0179901 A1* | 6/2018 | Martin, Jr. | F01D 5/28 |
| 2019/0176273 A1* | 6/2019 | Srinivasan | B23P 6/007 |

FOREIGN PATENT DOCUMENTS

| | | |
|---|---|---|
| EP | 1559870 A2 | 8/2005 |
| JP | H07233703 A | 9/1995 |
| WO | WO03029616 A1 | 4/2003 |
| WO | WO2017018981 A1 | 2/2017 |
| WO | WO2017020178 A1 | 2/2017 |

\* cited by examiner

GAS TURBINE MOVING BLADE

This claims the benefit of German Patent Application DE 102018215728.6, filed Sep. 17, 2018 and hereby incorporated by reference herein.

The present invention relates to a moving blade for a turbine or compressor stage of a gas turbine, a turbine or compressor stage for a gas turbine and a gas turbine, in particular an aircraft engine gas turbine including the moving blade, as well as a method for manufacturing the moving blade.

SUMMARY OF THE INVENTION

It is an object of the present invention is to improve a gas turbine.

It is an object of the invention to provide a moving blade. It is also an object of the present invention to provide a turbine or compressor stage for a gas turbine and a gas turbine including one or multiple moving blades described herein and a method for manufacturing a moving blade described herein. Advantageous specific embodiments of the present invention are the subject matter of the subclaims.

According to one embodiment of the present invention, a moving blade for a turbine or compressor stage of a gas turbine, in particular one or multiple moving blades of one or multiple turbine stage(s) and/or one or multiple compressor stage(s) for a gas turbine, in particular an aircraft engine gas turbine, (each) include a vane and a radially outer shroud.

In one embodiment, the vane is or becomes provided, in particular configured or used, for deflecting the flow, and/or includes, in particular for this purpose, a leading and a trailing edge as well as a pressure side and a suction side, which connect the leading and trailing edges. In one embodiment, the moving blade is hollow, which makes it possible to advantageously reduce weight.

In one embodiment, the moving blade is nondestructively detachably situated, in particular in a form-fitting and/or frictionally engaged manner, on a rotor of the (turbine or compressor stage of the) gas turbine, or is provided, in particular configured, for this purpose or used for this purpose. In another embodiment, the moving blade is or becomes not nondestructively detachably situated on a rotor of the (turbine or compressor stage of the) gas turbine, in particular integrally formed therewith or integrally joined thereto.

In one embodiment, an axial direction is in parallel, in particular coaxial, to a rotation or (main) machine axis of the (turbine or compressor stage of the) gas turbine, a circumferential direction is in parallel to a rotation direction around this axis, a radial direction is perpendicular to the axial and circumferential directions.

Accordingly, in one embodiment, the radially outer shroud is an outer shroud and/or integrally formed with the moving blade or integrally joined thereto.

According to one embodiment of the present invention, for one or multiple contour points of an outer contour of a profile cross section of the vane at a radially outer gas channel boundary (of the shroud or through the shroud), in particular for at least 50%, in one embodiment at least 75%, in particular at least 90%, in one embodiment at least 99%, (of all contour points) of the outer contour of this profile cross section (in each case), an, in particular radial, wall thickness of the shroud at, in particular in, one or multiple edge points of the shroud, whose connecting line(s), together with the (particular) contour point with an or the normal, which is perpendicular to the outer contour of this profile cross section in this contour point and, in one embodiment, passes through an edge point of the shroud, encloses or enclose an angle which is no more than 5°, in particular no more than 10°, in one embodiment no more than 15°, in particular for at least 50%, in one embodiment at least 75%, in particular at least 90%, in one embodiment at least 99%, of all edge points of the shroud, whose connecting lines, together with the (particular) contour point, with the normal, which in this contour point is perpendicular to the outer contour of this profile cross section and, in one embodiment passes through an edge point of the shroud, enclose an angle in each case, which is no more than 5°, in particular no more than 10°, in one embodiment no more than 15°, is less than a wall thickness of the shroud at the (particular) contour point, in one embodiment this edge point or these edge points each being (gas channel-side edge) points (of an edge) of a gas channel side or a surface of the shroud on the gas channel side or facing the gas channel.

In one embodiment, for one or multiple contour points $P_{K,i}$ of the outer contour of the profile cross section of the vane at the radially outer gas channel boundary in each case, the in particular radial wall thickness $t(P_{R,ij})$ of the shroud at or in one or multiple edge points $P_{R,ij}$ of the gas channel-facing or radially inner surface of the shroud is less than wall thickness $t(P_{K,i})$ of the shroud at or in this contour point $P_{K,i}$, these edge points $P_{R,ij}$ being each situated in a cone, together with the normal passing through an edge point on the outer contour of the profile cross section in contour point $P_{K,i}$ as a cone axis and having half an opening or cone angle, which is no more than 5°, in particular no more than 10°, in one embodiment no more than 15°, in one embodiment this applying to at least 50%, in particular at least 75%, in one embodiment at least 90%, in particular at least 99%, of all edge points $P_{R,ij}$ within this cone around this normal in particular contour point $P_{K,i}$ and/or to at least 50%, in particular at least 75%, in one embodiment at least 90%, in particular at least 99%, of all contour points $P_{K,i}$ of the outer contour of the profile cross section, and/or edge points mentioned herein being (gas channel-side edge) points (of an edge) of a gas channel side or a surface of the shroud on the gas channel side or facing the gas channel.

In one embodiment, the weight of the shroud may be particularly advantageously reduced hereby, while fulfilling an advantageous structural-mechanical, aerodynamic and/or thermal function. In one embodiment, in turn, the weight of the supporting structure, in particular of the vane and/or blade root or a rotor disk and/or an armor plating or a so-called containment may be reduced thereby for protection in the case of failure of the vane, and thus the weight of the (turbine or compressor stage of the) gas turbine may be (further) reduced, while fulfilling an advantageous structural-mechanical, aerodynamic and/or thermal function.

In one embodiment, the wall thickness at (particular) edge point $P_{R,ij}$ is (in each case) no more than 70% and/or at least 5% of the wall thickness of the shroud at (particular) contour point $P_{K,i}$ ($0.05 \cdot t(P_{K,i}) \leq t(P_{R,ij}) \leq 0.70 \cdot t(P_{K,i})$), in particular, therefore, for one or multiple contour points $P_{K,i}$, in one embodiment for at least 50%, in particular at least 75%, in one embodiment at least 90%, in particular at least 99%, of all contour points $P_{K,i}$ of the outer contour of the profile cross section and/or for one or multiple edge points $P_{R,ij}$, in one embodiment for at least 50%, in particular at least 75%, in one embodiment at least 90%, in particular at least 99%, of all edge points $P_{R, ij}$, within the cone around the normal on the outer contour of the profile cross section in particular contour point $P_{K, i}$, having half an opening or cone angle of no more than 5°, in particular no more than 10°, in one embodiment no more than 15°.

In one embodiment, the weight of the shroud may be particularly advantageously reduced hereby, while fulfilling an advantageous structural-mechanical, aerodynamic and/or thermal function. In one embodiment, in turn, the weight of the supporting structure, in particular of the vane and/or blade root or a rotor disk and/or an armor plating (containment) may be particularly advantageously reduced thereby for protection in the case of failure of the vane, and thus the weight of the (turbine or compressor stage of the) gas turbine may be particularly advantageously (further) reduced, while fulfilling an advantageous structural-mechanical, aerodynamic and/or thermal function.

In one embodiment, the wall thickness of the shroud along the (particular) connecting line from (particular) edge point $P_{R, ij}$ to (particular) contour point $P_{K, i}$ decreases monotonously, in particularly strictly monotonously, in one embodiment non-linearly and/or in another embodiment linearly strictly monotonously, in particular, therefore, along the (particular) connecting line of one or multiple contour points $P_{K, i}$, in one embodiment for at least 50%, in particular at least 75%, in one embodiment at least 90%, in particular at least 99%, of all contour points $P_{K, i}$ of the outer contour of the profile cross section and/or for one or multiple edge points $P_{R, ij}$, in one embodiment for at least 50%, in particular at least 75%, in one embodiment at least 90%, in particular at least 99%, of all edge points $P_{R, ij}$, within the cone around the normal on the outer contour of the profile cross section, in particular contour point $P_{K, i}$, having half an opening or cone angle of no more than 5°, in particular no more than 10°, in one embodiment no more than 15°.

In one embodiment, the weight of the shroud may be particularly advantageously reduced hereby, while fulfilling an advantageous structural-mechanical, aerodynamic and/or thermal function. In one embodiment, in turn, the weight of the supporting structure, in particular of the vane and/or an armor plating (containment) may be particularly advantageously reduced thereby for protection in the case of failure of the vane, and thus the weight of the (turbine or compressor stage of the) gas turbine may be particularly advantageously (further) reduced, while fulfilling an advantageous structural-mechanical, aerodynamic and/or thermal function.

According to one embodiment of the present invention, the moving blade, in particular its shroud and/or its vane, is or becomes completely or partially manufactured with the aid of an additive or generative manufacturing method, in particular selective laser melting.

In one embodiment, a moving blade according to the present invention, in particular a wall thickness according to the present invention of the shroud, may be particularly advantageously implemented hereby.

In one embodiment, one or both end faces of the shroud has/have, in the circumferential direction, (in each case) at least one cam having a top cam point in the circumferential direction and at least one groove having a bottom groove point in the circumferential direction; in particular the shroud may have so-called Z-notches, which are known per se, or a Z-type (end wall) contouring.

In one embodiment, the shrouds may be advantageously supported on each other hereby in the circumferential direction of adjacent moving blades.

In one refinement, the wall thickness at, in particular in, one or multiple edge points (of the end face) between the cam and the groove and/or at, in particular in, one or multiple edge points (of the end face) on a side of the cam facing away from the groove and/or at, in particular in, one or multiple edge points (of the end face) on a side of the groove facing away from the cam is (in each case) less than at or in this cam point and/or groove point. In one embodiment, the wall thickness of the shroud at the Z-notches themselves is thus greater than in at least one area of the edge of the shroud in particular axially adjacent thereto, or of the particular end face.

In one embodiment, advantageous contact surfaces of moving blades adjacent to each other in the circumferential direction may be implemented hereby, and/or a bending resistance of the shroud may be advantageously increased.

In one embodiment, the shroud has, in one refinement, on a side facing away from the gas channel, one or multiple depressions, which are pocket-like in one embodiment.

In one embodiment, the weight of the shroud may be particularly advantageously reduced hereby, while fulfilling an advantageous structural-mechanical, aerodynamic and/or thermal function. In one embodiment, in turn, the weight of the supporting structure, in particular of the vane and/or an armor plating (containment) may be particularly advantageously reduced thereby for protection in the case of failure of the moving blade, and thus the weight of the (turbine or compressor stage of the) gas turbine may be particularly advantageously (further) reduced, while fulfilling an advantageous structural-mechanical, aerodynamic and/or thermal function.

In one embodiment, one or multiple sealing ribs, in one refinement running in the circumferential direction and/or radially, are situated on a side of the shroud facing away from the gas channel. In one embodiment, these sealing ribs may be integrally formed with the shroud or be integrally joined thereto. Nevertheless, in one embodiment, they are not part of the shroud with respect to the wall thickness of the shroud. In other words, in one embodiment, sealing ribs of this type are (virtually) disregarded during the measurement or definition of the wall thickness of the shroud, or viewed as the wall thickness of the shroud in an area of a sealing rib with respect to a (virtual) surface of the shroud facing away from the gas channel, which linearly connects the two shroud-side edges of the sealing rib to each other.

BRIEF DESCRIPTION OF THE DRAWINGS

Further advantageous refinements of the present invention are derived from the subclaims and the following description of preferred embodiments. In a partially schematic illustration:

DETAILED DESCRIPTION

Figure 1:
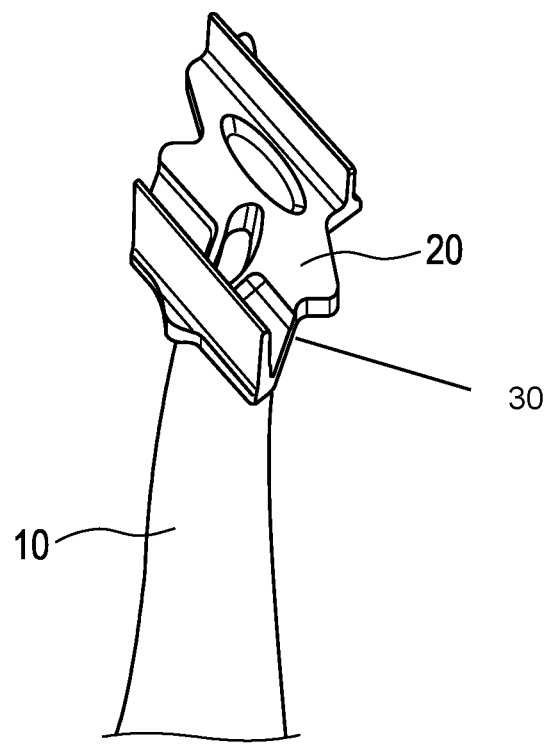
FIG. 1 shows a perspective view of one part of a moving blade according to one embodiment of the present invention.
Figure 2:
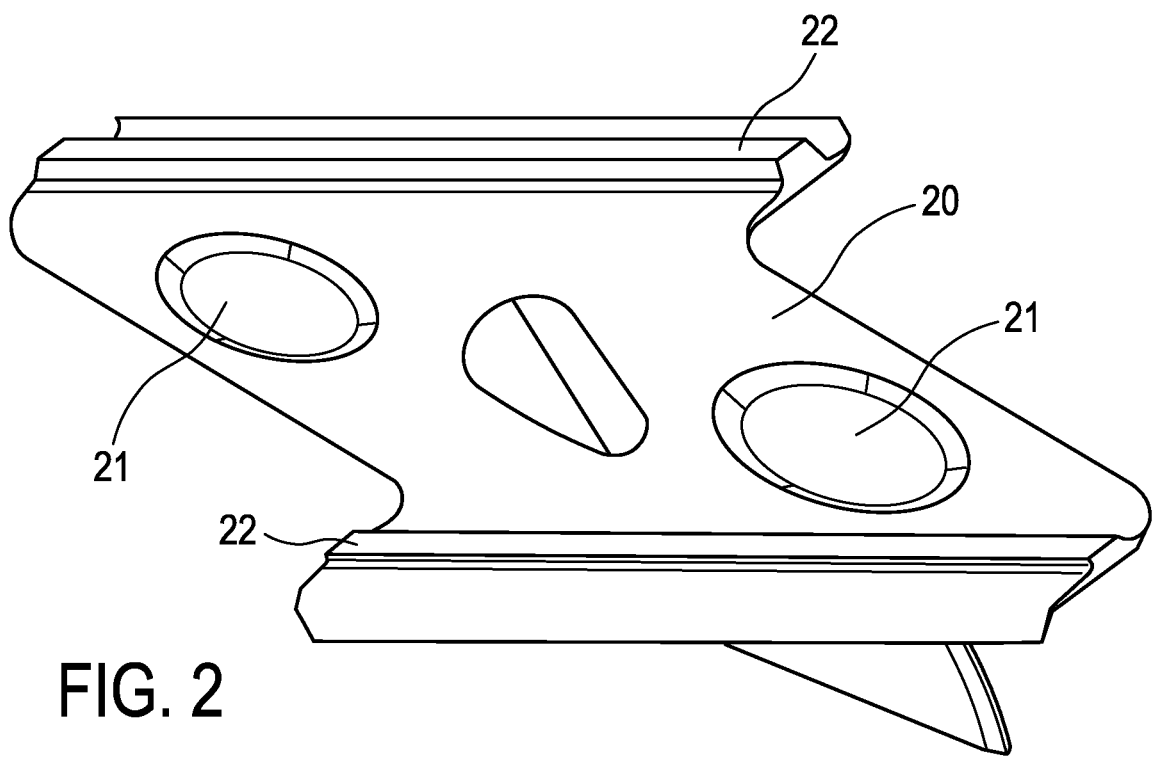
FIG. 2 shows a top view of the moving blade radially from the outside.

FIG. 1 shows a perspective view of one part of a moving blade according to one embodiment of the present invention, including one part of a vane 10 and a radially outer shroud 20 (at the top in FIG. 1); FIG. 2 shows a top view of the moving blade or its shroud 20 radially from the outside, in which pocket-like depressions 21 as well as two sealing ribs 22 are apparent.

Figure 3:
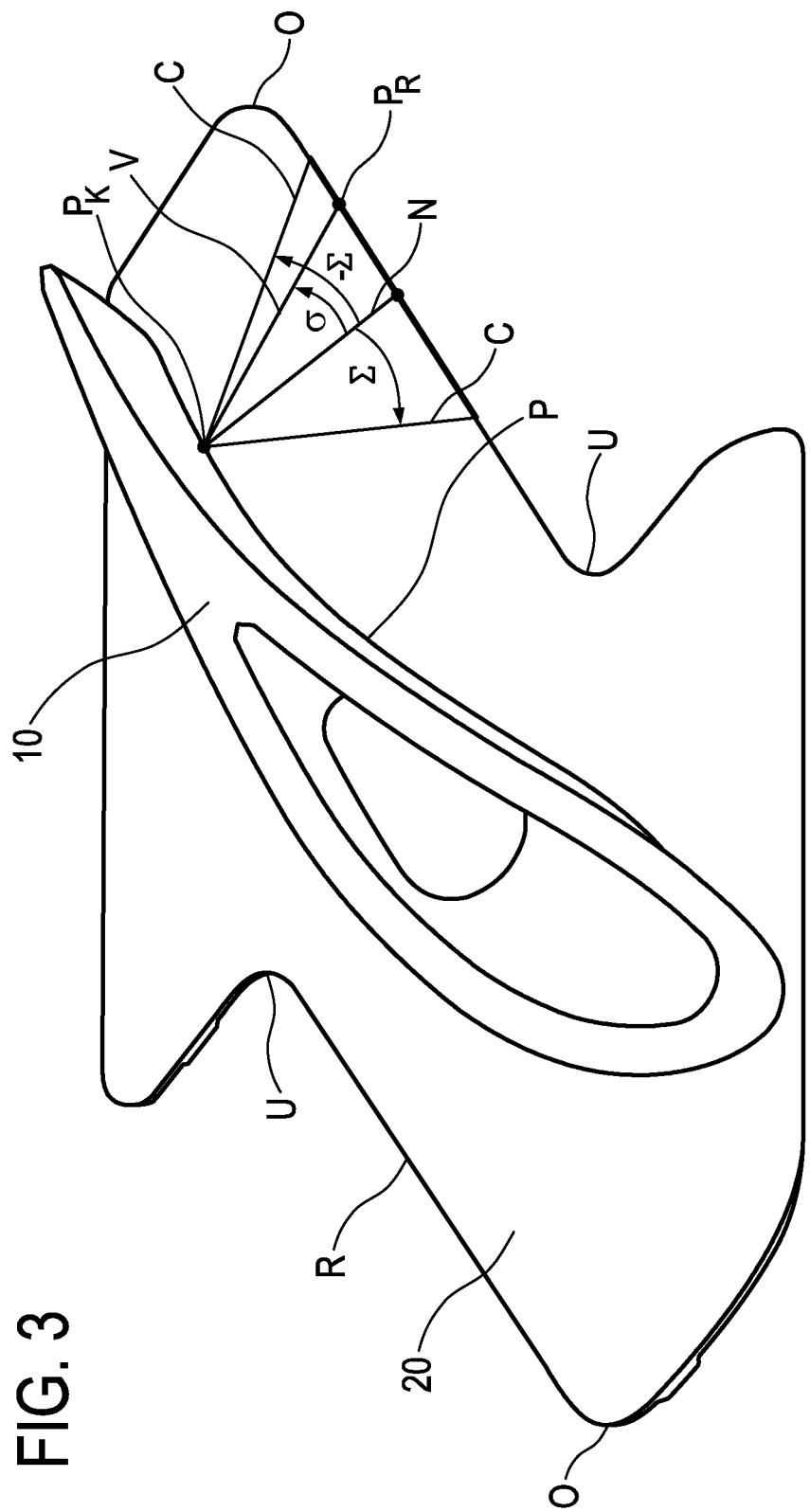
FIG. 3 shows a sectional view of the moving blade radially from the inside.

FIG. 3 shows a sectional view of the moving blade radially from the inside, i.e. a sectional view of its hollow vane 10.

It is apparent that the two end faces of the shroud each have a cam or lobe in the circumferential direction, i.e., the left end face in FIG. 3 and the right end face in FIG. 3, which has a top cam point O in the circumferential direction and a groove having a bottom groove point U in the circumferential direction.

In each case, the wall thickness of shroud 20 is slightly greater at the cams and grooves than in the areas axially adjacent thereto (vertically in FIG. 3, 30 in FIGS. 1 and 4), so that, in particular the wall thickness at at least one edge point between the cam and the groove and/or at at least one edge point on a side of the cam facing away from the groove (left: bottom; right: top in FIG. 3) and/or at at least one edge point on a side of the groove facing away from the cam (left: top; right: bottom in FIG. 3) is less than at the particular cam point and groove point.

Normal N in contour point $P_K$, which is perpendicular to outer contour P and passes through an edge point of the gas channel-side surface of shroud 20, which is viewed from above in FIG. 3, is plotted in FIG. 3 as an example of a contour point $P_K$ of an outer contour of a profile cross section P of vane 10 at a radially outer gas channel boundary of the shroud.

A normal cone around this normal N is marked by C, which includes half a cone or opening angle $\Sigma$ of 15°.

Figure 4:
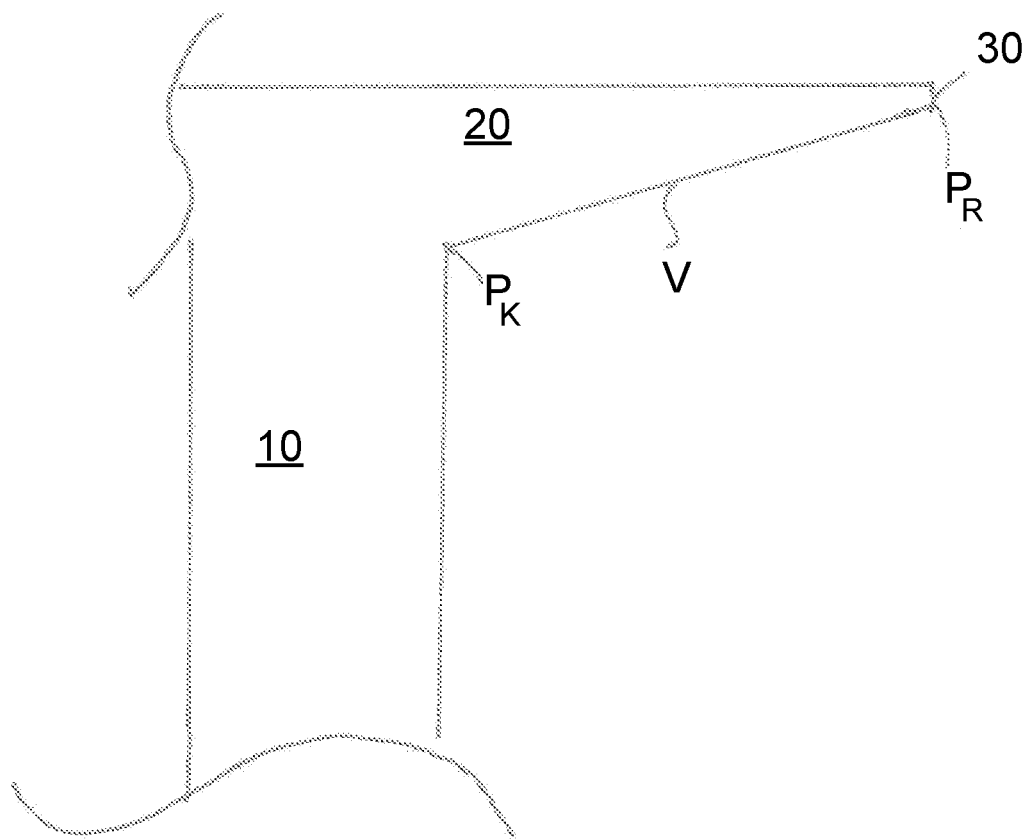
FIG. 4 shows the thickness between $P_K$ and $P_R$ in FIG. 3.

For at least 50% of all edge points of shroud 20 or its gas channel-side surface within this normal cone C, of which one edge point $P_R$ as well as its connecting line V, including contour point $P_K$, is plotted by way of example in FIG. 3, a wall thickness of shroud 20 along the particular connecting line, including contour point $P_K$, decreases and/or, at the edge point itself, is between 5% and 70% of a wall thickness of shroud 20 at contour point $P_K$. (FIG. 4).

Accordingly, angle $\sigma$ enclosing connecting line V of an edge point $P_R$ of this type, with normal N, is smaller than or equal to half the cone or opening angle $\Sigma$ of 15° in terms of absolute value.

The wall thickness profiles or conditions explained above by way of example for a contour point $P_K$ of outer contour P plotted in FIG. 3 apply to at least 50% of all contour points of outer contour P.

While the description above explains exemplary embodiments, it should be pointed out that a large number of modifications are possible. Moreover, it should be pointed out that the exemplary embodiments are only examples which are not intended to limit the scope of protection, the applications and the design in any way. Rather, the description above gives those skilled in the art a guideline for implementing at least one exemplary embodiment, various modifications being possible, in particular with respect to the function and arrangement of the described components, without departing from the scope of protection as it is derived from the claims and feature combinations equivalent to the claims.

LIST OF REFERENCE NUMERALS 10 vane
20 shroud
21 depression
22 sealing rib
C normal cone
N normal
O (top) cam (point)
P outer contour of a profile cross section
$P_K$ contour point
$P_R$ edge point
R edge
U (bottom) groove (point)
V connecting line
$\Sigma$ half-cone angle
$\sigma$ angle between normal N and connecting line V

What is claimed is:

1. A moving blade for a turbine or compressor stage of a gas turbine, comprising:
   a blade; and
   a radially outer shroud,
      for at least one contour point ($P_K$) of an outer contour of a profile cross section of the blade at a radially outer gas channel boundary, a wall thickness of the shroud at at least one edge point ($P_R$) of the shroud is less than a wall thickness of the shroud at the at least one contour point, wherein a connecting line (V), which connects the at least one contour point with the at least one edge point, intersects the at least one contour point and encloses an angle ($\sigma$) of no more than 5° with a normal (N) perpendicular to the outer contour of the profile cross section at the at least one contour point, and wherein the wall thickness of the shroud decreases strictly monotonically along the connecting line, wherein the at least one contour point ($P_K$) is located at a junction between the blade and the shroud; and
   the shroud having two opposing end faces in a circumferential direction, at least one of the end faces of the shroud in the circumferential direction having a cam having an uppermost cam point (O) in the circumferential direction and a groove having a lowermost groove point (U) in the circumferential direction forming an end face surface, wherein the wall thickness of the shroud at at least one edge point between the cam and the groove, the wall thickness of the shroud at at least one edge point on a side of the cam facing away from the groove and the wall thickness of the shroud at at least one edge point on a side of the groove facing away from the cam is smaller than the wall thickness of the shroud at the uppermost cam point and/or the lowermost groove point.

2. The moving blade as recited in claim 1 wherein the wall thickness of the shroud at the at least one edge point is no more than 70% or at least 5% of the wall thickness of the shroud at the at least one contour point.

3. The moving blade as recited in claim 1 wherein for a second contour point of the outer contour of the profile cross section, the wall thickness of the shroud at a second edge point of the shroud, wherein a second connecting line intersects the second contour point with a second normal perpendicular to the outer contour of the profile section and wherein the second connecting line and the second normal form an angle of no more than 5°, is less than a wall thickness of the shroud at the second contour point wherein the second contour point is located at a junction between the blade and the shroud.

4. The moving blade as recited in claim 3 wherein the wall thickness of the shroud at the second edge point is no more than 70% or at least 5% of the wall thickness of the shroud at the second contour point, or the wall thickness of the shroud decreases monotonically along the second connecting line.

5. The moving blade as recited in claim 3 wherein the wall thickness of the shroud along the second connecting line decreases strictly monotonically.

6. The moving blade as recited in claim 1 wherein the moving blade is at least partially manufactured with an additive manufacturing method.

7. The moving blade as recited in claim 6 wherein the additive manufacturing method includes selective laser melting.

8. The moving blade as recited in claim 1 wherein the shroud has at least one depression.

9. The moving blade as recited in claim 8 wherein the at least one depression is on a side facing away from the gas channel boundary.

10. The moving blade as recited in claim 1 further comprising at least one sealing rib situated on a side of the shroud facing away from the gas channel boundary.

11. A turbine or compressor stage for a gas turbine comprising at least one moving blade as recited in claim 1.

12. A gas turbine comprising at least one turbine or compressor stage as recited claim 11.

13. An aircraft gas turbine engine comprising the gas turbine as recited in claim 12.

14. A method for manufacturing the moving blade as recited in claim 1 comprising: at least partially manufacturing the moving blade with an additive manufacturing method.

15. The method as recited in claim 14 wherein the method includes selective laser melting.

16. The moving blade as recited in claim 1 wherein the shroud includes, on a side facing away from the gas channel boundary, a pair of depressions.

* * * * *